United States Patent [19]
Bloecker

[11] Patent Number: 5,143,195
[45] Date of Patent: Sep. 1, 1992

[54] ASSEMBLY STATION

[75] Inventor: Detlef Bloecker, Keonigswinter, Fed. Rep. of Germany

[73] Assignee: Protech Automation GmbH, Fed. Rep. of Germany

[21] Appl. No.: 765,293

[22] Filed: Sep. 25, 1991

[51] Int. Cl.[5] .............................................. B65G 15/64
[52] U.S. Cl. ............................... 198/345.3; 198/465.1; 198/346.1
[58] Field of Search ............... 198/345.3, 346.1, 465.1; 29/33 P

[56] References Cited

U.S. PATENT DOCUMENTS

| 4,917,226 | 4/1990 | Blöcker | 198/346.1 X |
|---|---|---|---|
| 4,928,806 | 5/1990 | Anderson et al. | 198/346.1 X |
| 5,002,175 | 3/1991 | Drexel et al. | 198/345.3 |
| 5,007,527 | 4/1991 | Ach et al. | 198/346.1 X |

FOREIGN PATENT DOCUMENTS 3832845  7/1989  Fed. Rep. of Germany .

Primary Examiner—Robert P. Olszewski
Assistant Examiner—Cheryl L. Gastineau
Attorney, Agent, or Firm—Diller, Ramik & Wight

[57] ABSTRACT

A conveyer (10) is provided for the transport of workpiece carriers (12) to be received by a positioning and holding member (15) for processing of the workpieces arranged on the carriers. A stopper member (30) is arranged behind the positioning and holding member (15) as seen in transport direction. A leading workpiece carrier (I) is stopped by the stopper member (30) in such a manner that a following workpiece carrier (II) is brought to a standstill exactly in the receiving position of the positioning and holding member (15). This allows exact positioning and separation of the workpiece carriers without the need of highly precise control of a separating member. A leading workpiece carrier (I) will remain in its position at the stopper (34) until having stopped a following workpiece carrier (II) in the positioning and holding member (15).

12 Claims, 4 Drawing Sheets

ASSEMBLY STATION

The invention is directed to an assembly station for assembling workpieces in a manufacturing process.

It is well known that production plants, particularly assembly plants, involve the use of conveyers being provided e.g. as belt conveyers, chain conveyers or roller conveyers. The workpiece carriers are set onto the conveyer in the form of pallets for transport between handling positions. At these handling positions, the workpiece carriers are stopped, fixed, raised and arrested while the conveyer, as far as it is a driven conveyer, can keep on running.

An assembly station is described in German Patent 38 32 845. In this assembly station, the positioning and holding means, by which a workpiece carrier is raised from the conveyer, is arrested and, in a defined manner, is positioned and held in place, consists of a plurality of blades fixedly arranged on one side of the transport path and adapted for engagement into a V-shaped groove on the side of the workpiece carrier, and of a plurality of movable pins arranged on the opposite side of the transport path and adapted for entering into center bores of the workpiece carrier. Said blades and pins cause the workpiece carrier to be lifted off the conveyer. For allowing exact entrance of the pins into the positioning bores of the workpiece carrier, a stopper means is necessary for bringing the workpieces to a standstill at the positioning and holding means. This stopper means consists of a pivotable element arranged in the transport path of the workpiece carriers and being operated in such a manner that it projects into the transport path and thus acts as a stopper for the workpiece carrier or, in a second position, will clear the transport path. In this known assembly station, the conveyer is a duplex conveyer with two parallel conveyer belts having the lateral edges of the workpiece carriers resting thereon. The movable stopper is arranged between the transport belts below the transport path.

In certain uses, it is not possible to arrange the stopper means in the transport path under the workpiece carriers. This is the case if the workpiece carriers are small-sized. There are workpiece carriers with an edge length of only 20-50 mm designed for receiving small-sized constructional units, e.g. electrical or electronic components. Such workpiece carriers often require employment of a simplex conveyer with only one conveyer belt. Even if use of a duplex conveyer is possible, the space between the two conveyer belts is often insufficient for mounting the stopper means therebetween.

It is an object of the invention to provide an assembly station which is adapted for use also under unfavorable space conditions, particularly with small-sized workpiece carriers, and allows exact stopping of individual workpiece carriers at the positioning and holding means as well as the separation of closely successive workpiece carriers.

In the assembly station of the invention, the stopper means is located in a distance corresponding to an integral multiple of the workpiece carrier length downstream of the receiving position, where a workpiece carrier can be received by the positioning and holding means. The stopper means comprises a movable stopper projecting laterally into the transport path, for abutment of the leading workpiece carrier thereagainst. The following workpiece carrier, abutting against the already stopped leading workpiece carrier, will be positioned exactly at the receiving position of the positioning and holding means. In this manner, it is also possible to separate successive workpiece carriers because the leading workpiece carrier retained by the stopper means, after having stopped the following workpiece carrier and after the latter has been seized by the positioning and holding means, can be released for further transport by withdrawal of the stopper from the transport path. Thereafter, the stopper can be returned into the transport path for stopping said following workpiece carrier after release thereof from the positioning and holding means, so that this workpiece carrier will then stop the next following workpiece carrier at the positioning and holding means. In this manner, it does not occur that the stopper of the stopper means is passed by two immediately successive workpiece carriers. Instead, the stopper can be moved back into the empty transport path prior to arrival of the subsequent workpiece carrier. Thus, no highly accurate timing is required for controlling the stopper to engage between two workpiece carriers.

The assembly station of the invention automatically adapts itself to workpiece carriers arriving at random. The assembly station always holds one of the workpiece carriers at the stopper, thus using it as a catching element, until a following workpiece carrier has reached the positioning and holding means. It is only then that the workpiece carrier presently used as a positioning means will be released for further transport. Therefore, the respective leading workpiece carrier assists in the positioning of the subsequent workpiece carrier, while, at the same time, it is provided that the workpiece carriers leave the assembly stations with spatial intervals therebetween.

The assembly station of the invention is particularly adapted for small workpiece carriers having a maximum length of 50 mm, but is basically applicable also for large workpiece carriers.

Control of the stopper of the stopper means and of the pin of the positioning and holding means is preferably performed by sensors and, of course, by corresponding signals of the processing means for processing the workpieces on the workpiece carriers at the positioning and holding means. Release from the positioning and holding means must occur only upon completion the workpiece processing. On the other hand, release can be performed only when the subsequent transport path has been cleared and is not blocked by an accumulation of workpiece carriers. The conveyer keeps running continuously so that a stopped workpiece carrier slides on the conveyer.

In a preferred embodiment of the invention, the actuating mechanisms for the stopper and the positioning and holding means are identical in configuration, thus obtaining a simple modular arrangement allowing exchange of the components.

Preferably, a stiffening frame is provided at the positioning and holding means for bridging the support bar of the conveyer and thus keeping it free from the reaction forces of the clamping.

Embodiments of the invention will be described in greater detail hereunder with reference to the drawings.

Figure 1:
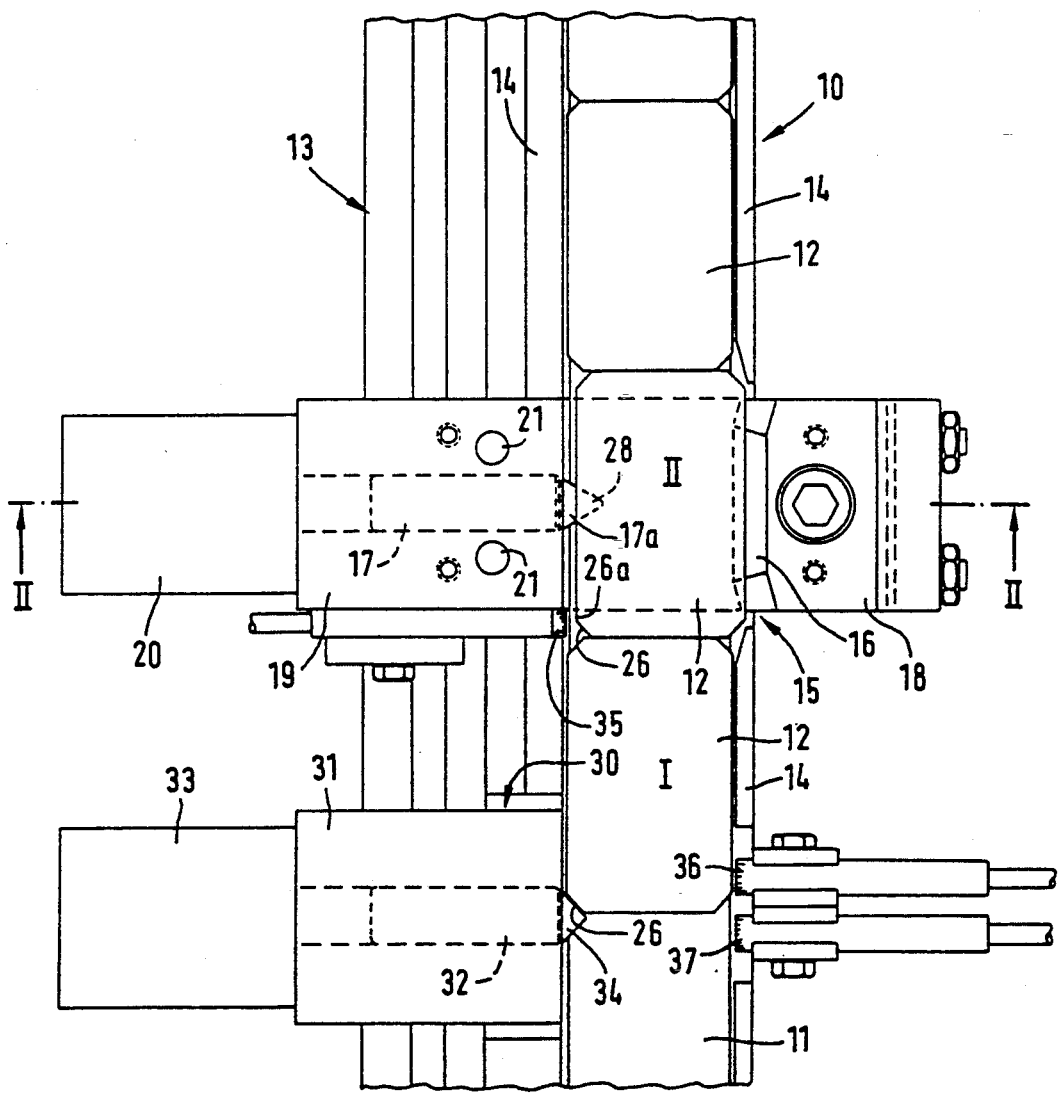
FIG. 1 is a plan view of the conveyer at the assembly station of a first embodiment of the invention.
Figure 2:
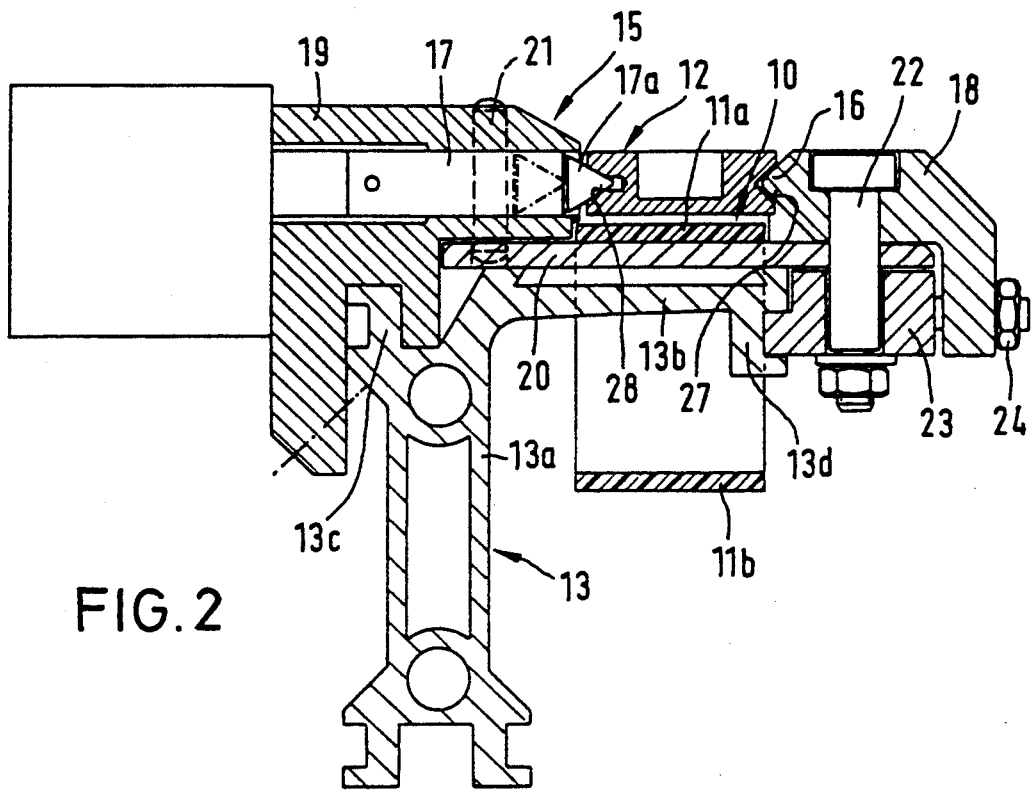
FIG. 2 is a sectional view along the line II—II of FIG. 1.
Figure 3:
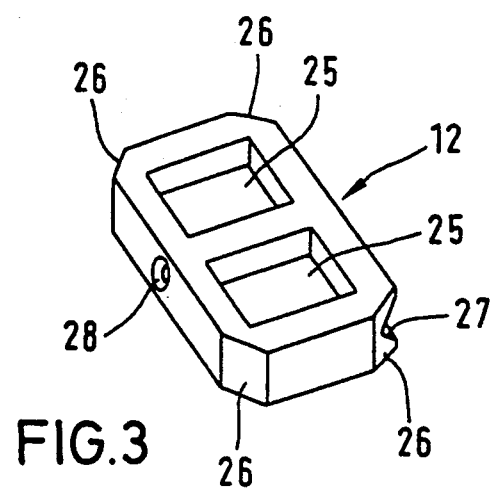
FIG. 3 is a perspective view of a workpiece carrier.

In the embodiment shown in FIGS. 1-3, there is provided a conveyer 10 comprising an endless conveyer belt 11. In FIG. 2, the upper strand of conveyer belt 11 is designated by 11a and the lower strand is designated by 11b. The workpiece carriers 12 lie on the upper strand 11a. The conveyer 10 is supported by a profiled carrier 13 comprising a vertical profiled bar 13a, a web 13b laterally projecting therefrom and two longitudinal clamping bars 13c und 13d. Web 13b provides the support for the upper strand 11a of the conveyer belt and the clamping bars 13c und 13d provide fastening means for components to be mounted on both sides of the conveyer. Web 13b has fastened thereto lateral guide means 14 laterally limiting the transport path and presenting gliding faces for the lateral walls of the workpiece carriers 12.

At the positioning and holding means 15, there are provided a fixed blade 16 on one side of the transport path and, on the opposite side, a pin 17 displaceable transversely to the transport path and having a tip 17a. Knife 16 is an integral part of a clamping block 18 fastened to web 13b, and pin 17 is guided in a clamping block 19 fastened to clamping bar 13c and carrying an actuating mechanism 19a for displacement of pin 17. Clamping blocks 18 and 19 are connected to each other by a stiffening frame 20 extending transversely across web 13b. By this stiffening frame 20, web 13b is kept free of the tensile forces being generated when workpiece carrier 12 is laterally clamped by the pressing force acting on pin 17. Stiffening frame 20 has its one end connected to block 19 by a vertical pin 21 and has its other end connected to block 18 by a bolt 22. Further, bolt 22 serves for holding the block 18 and a holder 23 clamped to clamping bar 13d. For fixing this clamping arrangement, there is provided a screw 24 being adjustable on block 18 and pressing horizontally against holder 23.

The workpiece carriers 12 consists of the twin troughs shown in FIG. 3. In particular, the workpiece carriers 12 are one-pieced iron members with two recesses 25 arranged behind each other in longitudinal direction. The workpiece carriers are generally rectangular in plan view, with the length (in transport direction) being twice as large as the width in the instant case. The edges of the workpiece carriers 12 present beveled portions 26 of 45° extending over the entire height thereof. A V-shaped groove 27 runs along one side of the workpiece carrier for engagement of blade 16 thereinto. A conical center bore 28 for engagement of tip 17a thereinto is arranged at the opposite side at the center of the longidininal dimension of the workpiece carrier. The troughs 25 are the receiving chambers for workpieces.

As can be seen in FIG. 1, the stopper means 30 is arranged downstream of the positioning and holding means 15. Stopper means 30 consists of a block 31 fastened to clamping bar 13c and having a pin 32 arranged therein to be displaced transversely to the direction of the transport path, and of the actuating mechanism 33 for displacement of pin 32. Pin 32 has a tip 34 with a vertical angle of 90°. Tip 34 forms a stopper to be abutted by the beveled portion 26 of the leading end of workpiece carrier 12. Block 31 and actuating mechanism 33 are of the same construction as block 19 and actuating mechanism 19a. Only tip 34 is different from tip 17a comprising a cone angle of only 60°.

As shown in FIG. 1, stopper means 30 is arranged by the length of one workpiece carrier 12 downstream of positioning and holding means 15 in transport direction. The leading workpiece carrier 12 being stopped by tip 34 is designated by I, and the following workpiece carrier abutting against said leading workpiece carrier I is designated by II. When the workpiece carrier II abuts on the leading workpiece carrier I, it is arranged exactly in the receiving position in positioning and holding means 15. When, in this situation, pin 17 is urged out of block 19 into the transport path of the workpiece carriers, it enters the center bore 28 and presses the workpiece carrier in the direction of blade 16. Since the horizontal central plane of blade 16 and tip 17a are located higher than the horizontal central plane of the V-shaped groove 27 and the center bore 28 of the workpiece carrier 12 resting on the conveyer belt 11, the workpiece carrier will be lifted off the conveyer belt. In this position, a processing and mounting means (not shown) can perform processing on the workpieces carried by workpiece carrier 12. Upon termination of the processing, pin 17 is retracted so that the workpiece carrier is again lowered onto the conveyer belt 11 for further transport thereon.

At the downstream end of block 19, there is arranged a first sensor 35 being provided as a proximity switch responding to the metal of the workpiece carriers. Sensor 35 reacts on the approach of the portion 26a of the workpiece carrier side wall following the beveled portion 26. Arrangement of this sensor is such that it will be activated by a portion 26 when the workpiece carrier II is in the receiving position of the positioning and holding means 15.

A second sensor 36 is arranged at the stopper means 30 opposite tip 34 at a position where sensor 36 is activated by the workpiece carrier when the workpiece carrier has just abutted against tip 34 by its beveled portion 26.

A third sensor 37 is arranged downstream of the first sensor 36 at a position adapted for detecting whether the portion of the transport path following stopper means 30 is clear, i.e. that no leading carrier projects into the area following stopper means 30. Namely, only if the transport path is clear for at least one workpiece carrier length, tip 34 can be withdrawn so as to relase workpiece carrier I for further transport. If, however, there is still a workpiece carrier in the range of the third sensor 37, relase of tip 34 is blocked. The sensors 36 and 37 are arranged on the side of blade 16, i.e. on the side of the transport path opposite the tips 17a and 34.

The sensors 35 and 36 are provided for controlling pins 17 and 32 in such a manner that a workpiece carrier I held by tip 34 can be released only when a following workpiece carrier II is held by positioning and holding means 15. Another precondition for release of workpiece carrier I consists in that the further transport path for receiving this workpiece carrier has to be free, i.e. that the third sensor 37 does not detect a leading workpiece carrier. If a workpiece carrier II is clampingly held in positioning and holding means 15 and the further transport path is clear, tip 34 will be retracted and workpiece carrier I will be taken along by the conveyor belt 11 moving thereunder. As soon as workpiece carrier 12 has passed the second sensor 36 (or the third sensor 37), tip 34 is moved again into the transport path. Only after tip 34 has been positioned in the transport path again, the positioning and holding means 15, by withdrawing tip 17a, can lower the subsequent workpiece carrier II onto the conveyer and release it. Thus, this workpiece carrier II runs against tip 34 by which it is retained until a following workpiece carrier has been received by positioning and holding means 15. Accordingly, a workpiece carrier I is held at stopper means 30 at all times, and the rear face of this workpiece carrier serves as a stopper for stopping a following workpiece carrier II which then will be held by the positioning and holding means 15.

If tip 34 of pin 32 were located at the position wherein sensor 35 is arranged according to FIG. 1, this tip, as soon as a workpiece carrier would leave the positioning and holding means, would have to be advanced at a very specific point of time for separating an immediately following second workpiece carrier from the first workpiece carrier. Such an extremely precise timing, which would also require exact detection of the positions of two workpiece carriers, is not necessitated in the above assembly station.

Figure 4:
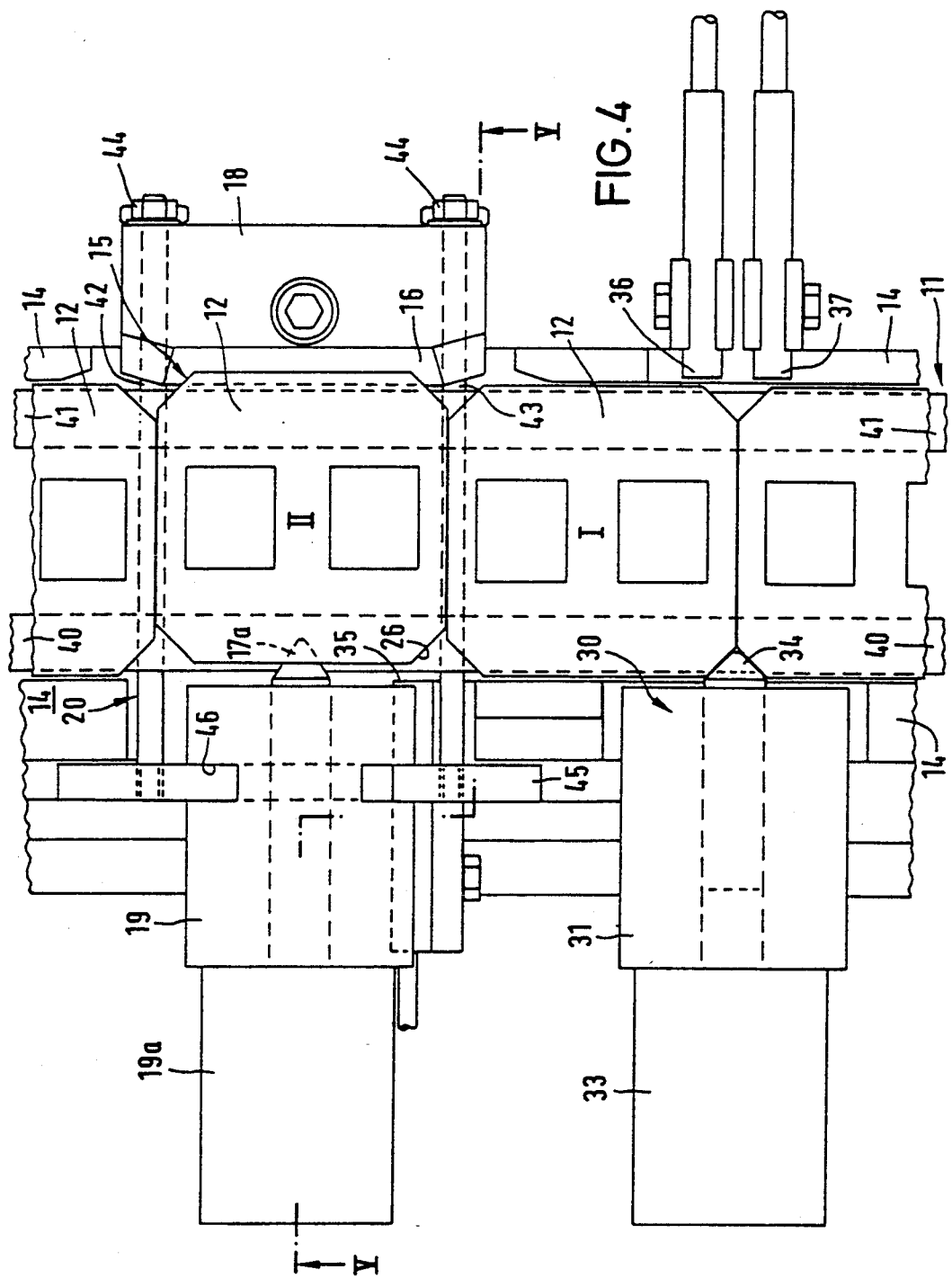
FIG. 4 is a plan view of the conveyer at the assembly station of a second embodiment.
Figure 5:
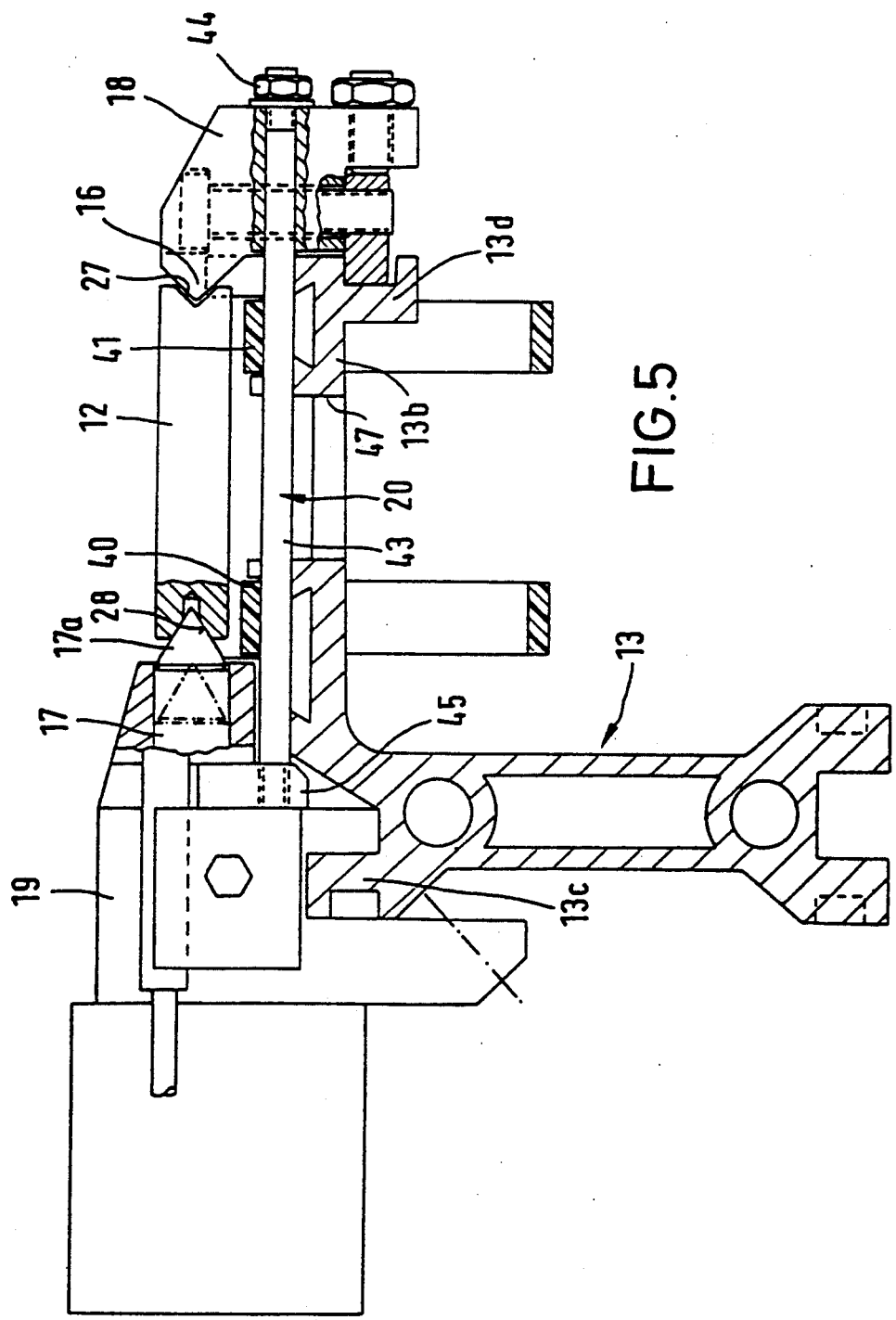
FIG. 5 is a sectional view of the embodiment of FIG. 4, taken substantially along the line V—V thereof.

The embodiment of FIGS. 4 and 5 largely corresponds to the first embodiment, with identical reference numerals being used for equal components in the two embodiments. The following description will be restricted to the differences from the first embodiment.

The conveyer 10 of FIGS. 4 and 5 is a duplex conveyer with two conveyer belts 40,41 extending in parallel to each other and at a mutual distance. The workpiece carriers 12 are set onto the conveyer belts 40,41 with the lateral edge portions of the carriers. In this embodiment, the workpiece carriers are of square shape but have also bevels 26 formed on their corners.

The stiffening frame 20 comprises two tension bars 42, 43 anchored to block 18 by nuts 44 and having their other end connected to a forked holder 45 for engagement into a suitable recess 46 of block 19; thus, forces of block 19 extending transversely to the transport direction are transferred to holder 45 and from there to block 18 through tension bars 42,43. The tension bars 42,43 extend through transverse bores of web 13b.

Web 13b has recesses 47 (FIG. 5) formed therein for allowing access to the underside of the workpiece carriers. These recesses 47 can be provided with sensors, active or passive components of the conveyer, or tool systems for engaging the workpieces from below if the workpiece carriers are provided with continuous vertical passages instead of the recesses 25 or nests, respectively.

A particular advantage resides in that the construction of the conveyer 10 is open at one side, i.e. that the vertical profiled bar 13a is arranged only on one side of the web 13b of profiled carrier 13. This allows easy exchange of an endless conveyer belt towards the laterally projecting end of web 13b. Particularly in a duplex conveyer with two endless conveyer belts, the belts can be readily exchanged from the side without the need of separating the respective belts.

I claim:

1. An assembly station comprising a conveyer (10) for conveying workpiece carriers (12) thereon, a stopper means (30) for stopping the workpiece carriers (12) on the transport path, and a positioning and holding means (15) for receiving a workpiece carrier (12) stopped in a receiving position and subsequently releasing said workpiece carrier (12) for further transport, wherein the stopper (30) means comprises a movable stopper (34) projecting laterally into the transport path, and wherein the stopper means (30) is positioned by a distance corresponding to at least one workpiece carrier length downstream of a workpiece carrier (II) held by the positioning and holding means (15), so that the workpiece carrier (II) to be received by the positioning and holding means (15) is held in the receiving position by at least one leading workpiece carrier (I) having been stopped by the stopper means (30).

2. The assembly station according to claim 1 wherein the workpiece carriers (12) have at least one of their leading edges provided with a beveled portion (26) for abutment against the stopper (34).

3. The assembly station according to claim 1 wherein a first sensor (35) is arranged in such a position that the sensor (35) can detect the presence of a workpiece carrier (II) in the receiving position at the positioning and holding means (15) and then actuate the positioning and holding means (15).

4. The assembly station according to claim 3 wherein a second sensor (36) is arranged at the stopper means (30) for detecting the presence of a workpiece carrier (I) stopped by the stopper (34) and for generating a signal allowing operation of the positioning and holding means (15) upon actuation of the first sensor (35).

5. The assembly station according to claim 4 wherein a third sensor (37) is provided for detecting whether the conveyer (10) downstream of the stopper means (30) is free and for initiating release of the stopper (34) if the conveyer (10) is free and if each of the first and second sensors detect a workpiece carrier (I,II).

6. The assembly station according to claim 1 wherein the positioning and holding means (15) can be released only if the stopper (34) projects into the transport path.

7. The assembly station according to claim 5 wherein the stopper (34) is advanced into the transport path if the second sensor (36) does not detect a workpiece carrier (I).

8. The assembly station according to claim 3 wherein the first sensor (35) is arranged laterally at the transport path at the location of that portion of the side wall of a workpiece carrier (II) arranged in the receiving position which is adjacent the beveled portion (26).

9. The assembly station according to claim 4 wherein the second sensor (36) is arranged laterally at the transport path at the location of that portion of the side wall of a workpiece carrier (I) stopped by the stopper means (30) which is adjacent the beveled portion (26).

10. The assembly station according to claim 5 wherein the third sensor (37) is arranged laterally at the transport path at a location immediately behind the stopper (34).

11. The assembly station according to claim 1 wherein the conveyer (10) is provided with a web (13b) supporting the upper strand of at least one conveyer belt (11) and wherein the positioning and holding means (15) has provided thereon a stiffening frame (20) extending transversely to the web (13b) for supporting, relative to each other, a blade (16) and an actuating element (17) arranged on the opposite side for gripping and holding a workpiece carrier.

12. The assembly station according to claim 1 wherein the actuating mechanisms for the stopper (34) and for the positioning and holding means (15) are identical in construction and are adjustable independently from each other along the conveyer (10).

* * * * *